United States Patent [19]
Robertson et al.

[11] Patent Number: 6,125,330
[45] Date of Patent: Sep. 26, 2000

[54] METHOD OF DETERMINING THE RESPONSE CAUSED BY MODEL ALTERATIONS IN SEISMIC SIMULATIONS

[75] Inventors: John Olof Anders Robertson, Histon; Christopher H. Chapman, Great Shelford, both of United Kingdom

[73] Assignee: Schlumberger Technology Corporation, Sugar Land, Tex.

[21] Appl. No.: 09/284,857

[22] PCT Filed: Aug. 19, 1998

[86] PCT No.: PCT/GB98/02482

§ 371 Date: Jun. 18, 1999

§ 102(e) Date: Jun. 18, 1999

[87] PCT Pub. No.: WO99/13357

PCT Pub. Date: Mar. 18, 1999

[30] Foreign Application Priority Data

Sep. 5, 1997 [GB] United Kingdom .................. 9718756

[51] Int. Cl.[7] ........................................... G01V 1/28
[52] U.S. Cl. ................................................ 702/14
[58] Field of Search .......................... 702/14, 16–18; 367/72, 73

[56] References Cited

U.S. PATENT DOCUMENTS

| 5,062,086 | 10/1991 | Harlan et al. . |
| 5,067,113 | 11/1991 | Hanson et al. . |
| 5,394,325 | 2/1995 | Schneider, Jr. . |
| 5,481,501 | 1/1996 | Blakeslee et al. . |
| 5,648,939 | 7/1997 | Folstad et al. .................. 367/73 |

FOREIGN PATENT DOCUMENTS

95/00915 A1  1/1995  WIPO .

OTHER PUBLICATIONS

Fischer, R., Lees, J. M. Shortest path ray tracing with sparse graphs Geophysics, Jul. 1993, USA, vol. 58, No. 7, pp. 987–996 XP002086253, ISSN 0016–8033.

Alterman, Z., Karal, F. C., JR. Propagation of elastic waves in layered media by finite difference methods Bulletin of the Seismological Society of America, 1968, vol. 58:1, 367–398, pp. 4–35.

Bergmann, T., Robertsson, J. O. A., Holliger, K. Numerical properties of staggered finite–difference solutions of Maxwell's equations for ground–penetrating radar modeling Geophysical Research Letters, Jan. 1996, vol. 23, No. 1, pp. 45–48.

Emmerich, H. 2–D wave propagation by a hybrid method Geophys. J. Int., 1989, vol. 99, pp. 307–319.

Emmerich, H. PSV–wave propagation in a medium with local heterogeneities: a hybrid formulation and its application Geophys. J. Int., 1992, vol. 109, pp. 54–64.

Fah, D., Suhadolc, P., Mueller St., Panza, G. F. A hybrid method for the estimation of ground motion in sedimentary basins: quantitative modeling for Mexico City Bulletin of the Seismological Society of America, Apr. 1994, vol. 84, No. 2, pp. 383–399.

(List continued on next page.)

*Primary Examiner*—Donald E. McElheny, Jr.
*Attorney, Agent, or Firm*—William L. Wang; William B. Batzer

[57] ABSTRACT

Described is a finite-difference methodology for efficiently computing the seismic response from a seismic model subject to several changes within sub-volumes. Initially, the response from an original model is calculated and the wave field is recorded at receivers and along closed surfaces around the sub-volumes. As changes occur, the recorded seismograms can be updated by simulating the response on small models encompassing the immediate neighborhood of the regions of change, the recording locations, and the parts of model that contribute to subsequent reflections and scattering recorded at the receivers. The recorded wave field can then be added to the reference wave field to obtain the seismic responses of alterations to the model without having to recalculate the full altered model.

11 Claims, 9 Drawing Sheets

OTHER PUBLICATIONS

Kelly, K. R., Ward, R. W., Treitel, S., Alford, R. M. Synthetic seismograms: A finite–difference approach Geophysics, Feb. 1976, vol. 41, No. 1, pp. 2–27.

Kosloff, R., Kosloff D. Absorbing boundaries for wave propagation problems Journal of Computational Physics, 1986, vol. 63, pp. 363–376.

Kummer, B., Behle, A., Dorau, F. Hybrid modeling of elastic–wave propagation in two–dimensional laterally inhomogeneous media Geophysics, Jun. 1987, vol. 52, No. 6, pp. 765–771.

Kurkjian, A. L., Coates, R. T., White, J. E., Schmidt, H. Finite–difference and frequency–wavenumber modeling of seismic monopole sources and receivers in fluid–filled boreholes Geophysics, Jul. 1994, vol. 59, No. 7, pp. 1053–1064.

Lecomte, I. Hybrid modeling with ray tracing and finite difference $66^{th}$ Annual Meeting of Society of Exploration Geophysicists, Denver, Col., 1996, pp. 699–702.

Levander, A. R. Finite–difference forward modeling in seismology The Encyclopaedia of Solid Earth Geophysics, edited by D. E. James, 1989, pp. 410–431. Van Nostrand Reinhold, New York.

McLaughlin, K. L., Day, S. M. 3D elastic finite–difference seismic–wave simulations Computers in Physics, Nov./Dec. 1994, vol. 8, No. 6, pp. 656–663.

Robertsson, J. O. A., Blanch, J. O., Symes, W. W. Viscoelastic finite–difference modeling Geophysics, Sep. 1994, vol. 59, No. 9, pp. 1444–1456.

Robertsson, J. O. A., Levander, A., Holliger, K. Modeling of the acoustic reverberation special research program deep ocean seafloor scattering experiments using a hybrid wave propagation simulation technique Journal of Geophysical Research, Feb. 1996, vol. 101, No. B2. pp. 3085–3101.

Robertsson, J. O. A., Levander, A., Holliger, K. A hybrid wave propagation simulation technique for ocean acoustic problems Journal of Geophysical Research, May 1996, vol. 101, No. B5, pp. 11225–11241.

Robertsson, J. O. A., Holliger, K. Modeling of seismic wave propagation near the earth's surface Physics of the Earth and Planetary Interiors, 1997, vol. 104, pp. 193–211.

Shtivelman, V. A hybrid method for wave field computation Geophysical Prospecting, 1984, vol. 32, pp. 236–257.

Shtivelman, V. Two–dimensional acoustic modeling by a hybrid method Geophysics, Aug. 1985, vol. 50, No. 8, pp. 1273–1284.

Stead, R. J., Helmberger, D. V. Numerical–analytical interfacing in two dimensions with applications to modeling NTS seismograms Pure Appl. Geophys., 1988, vol. 128, Nos. 1/2, pp. 157–193.

Vidale, J. E., Helmberger, D. V. Seismic strong motion synthetics: Path effects in strong motion seismology Computational Techniques, 1987, Academic Press, San Diego, Cal., pp. 267–317.

Zahradnik, J., Moczo, P. Hybrid seismic modeling based on discrete–wave number and finite–difference methods Pure Appl. Geophys., 1996, vol. 148, Nos. 1/2, pp. 21–38.

Witte, D. C. A pseudospectral method for simulating wave propagation PhD thesis, 1989, Columbia University, New York, pp. 1–307.

Wu, R–S., Aki, K. Introduction: Seismic wave scattering in three–dimensionally heterogeneous earth Pure Appl. Geophys., 1988, vol. 128, Nos. 1/2, pp. 1–6.

Fischer, R., Lee, J.M. Shortest path ray tracing with spares graphs Geophysics, Jul 1993, USA, vol. 58, No. 7, pp.987–996 XP00208653, ISSN 0016–8033.

Alterman, Z., Karal, P.C., Jr. Propagation of elastic waves in layered media by finite difference methods Bullentin of the Seismological Society of America, 1968, vol. 58:1, 367–398, pp. 4–35.

Bergmann, T., Robertsson, J.O.A., Hollinger, K. Numerial properties of staggered finite–difference solutions of Maxwell's equations for groung–penentrating radar modleing Geophyiscal Research Letters. Jan. 1996, vol. 23. no. 1, pp. 45–48.

Emmerich, H. PSV–wave propagation in a Medium wiht local hetergeneities: a Hybrid formulatioin and its application Geophys. J. Int., 1989, vol. 99, pp. 307–319.

Fä h , D., Suhadolc, P. Mueller St., Panza, G. F. A hybrid method for the estimation of ground motion in sedimentary basins: quantitative modeling for Mexico City Bullentin of the Seismological Society of America, Apr. 1994, vol. 84, No. 2, pp. 383–399.

Kelly, K. R., Ward, R. W., Treital, S. Alford, R. M. Synthetic seismograms: A finite–difference approach Geophyics, Feb. 1976, vol. 41, No. 1, pp. 2–27.

Kurkjian, A. L., Coates, R.T., White, J. E., Schmidt, H. Finite–difference and frequency–wavenumber modeling of seismic monopole sources and receivers in fluid–filled boreholes Geophysics, Jul 1994, vol. 59, No. 7, pp. 1053–1064.

Lecomte, I. Hybrid modeling with ray tracing and finite difference 66th Annual Meeting of Society of Exploration Geophyisicists, Denver, Col., 1996, pp. 699–702.

Levander, A. R. Finite–difference forward modeling in semismology The Encyclopaedia of Solid Earth Geophysics, edited by D.E. James, 1989, pp. 410–431. Van Nostrand Reinhold, New York.

Robertsson, J. O. A., Blanch, J. O., Symes, W. W. Visocelastic finite–difference modeling Geophysics, Sep. 1994, vol. 59, No. 9, pp. 1444–1456.

Robertsson, J. O. A., Holliger, K. Modeling of seismic wave progation near the earth's surface Phyics of the Earth and Planetary Interiors, 1997, vol. 104, pp. 193–211.

Shitvelman, V. A Hybrid method fro wave field computation Geophysical Prospecting, 1984, vol. 32, pp. 236–257.

METHOD OF DETERMINING THE RESPONSE CAUSED BY MODEL ALTERATIONS IN SEISMIC SIMULATIONS

The present invention relates to methods of determining the seismic response caused by alterations of a model in simulations of wave propagation. More specifically, it relates to determining the seismic response caused by model alterations in finite-difference (FD) simulations.

BACKGROUND OF THE INVENTION

A wide variety of seismic modeling, processing and inversion algorithms require the recalculation of the seismic response after incremental local alterations to an initial seismic finite-difference model. For example, pre-stack finite-difference migration of seismic data provides a highly accurate means of producing images of the Earth's interior. The migration algorithm consists of recalculating the finite-difference response of small local changes to the seismic model. However, full finite-difference migration is rarely performed because of computational limitations restricting migration algorithms to the use of less accurate asymptotic techniques. Another example relates to finite-difference inversion, where recalculating the finite-difference response is the core (forward modeling step) of the algorithms.

Yet another example which is considered as being an important area of the present invention refers to so-called time-lapse seismics (or 4-D seismics). In this application it is of interest to investigate the effects that small (local) changes to the model have on the seismic response, e.g., varying water-oil-contact levels in a producing reservoir.

Also, in forward modeling, it may be of interest to re-compute the response of an altered seismic model. Forward modeling may serve as a means of learning what effects certain features of a seismic model have on the full response. Also, as the knowledge of the model evolves, or as it becomes more refined, a simulated response may need to be updated.

Another area of interest regarding the present invention lies in Amplitude Variation with Offset (AVO) calculations, where the effects of, for instance, changes of the degree of anisotropy of a cap-rock may be the target of investigation.

Furthermore, FD modeling has been used in connection with borehole measurements, simulations of tool behavior and characteristics in their operational environment. Typically, it is of interest to investigate the effects that small changes to the tool design or model parameters have on the propagation of waves in the vicinity of the tool.

The common feature of these problems is that changes to the model are often restricted to a small sub-volume, but finite-difference simulations are required for the full model with several alterations. A method that would allow full finite-difference simulations for the complete model to be corrected for these changes while only requiring calculations in the sub-volume and its neighborhood could significantly reduce the computational cost both in terms of the number of calculations and memory for storage of material parameters and variable fields.

Finite-difference methods provide an accurate way of computing seismograms from complex seismic models. However, as mentioned above, the finite-difference simulations tend to become prohibitively expensive to run on even state-of-the-art computing equipment. Therefore, different approaches have been taken to make highly accurate numerical modeling methods such as finite-difference schemes more efficient. Two major directions of effort to achieve significant computational savings can be found in the literature: (1) hybrid techniques; and (2) grid-refinement techniques.

By combining methods appropriate for different wave propagation regimes, it is possible to increase computational efficiency as well as the simulation accuracy considerably. For details of such an approach, reference is made to Wu, R. S. and R. Aki, 1988, Introduction: Seismic wave scattering in three-dimensionally heterogeneous Earth, in: Scattering and Attenuation of Seismic Waves, edited by K. Aki and R. S. Wu, pp. 1–6. Birkhauser Verlag, Basel, Switzerland. Several such hybrid techniques have been developed for seismic applications. For example, a ray method can be used to propagate energy over long distances into an acoustic finite-difference grid at the scattering site. Also described are elastic methods combining boundary integral and finite-difference techniques. The hybridization, i.e. the interchange of wave fields between the methods, is based on Green's theorem. Stead and Helmberger (Stead, R. J. and D. V. Helmberger, 1988, Numerical-analytical interfacing in two dimensions with applications to modeling NTS seismograms, in: Scattering and Attenuation of Seismic Waves, see above, pp. 157–193) achieved the numerical propagation of an elastic wave field by means of the Kirchhoff integral by partitioning the wave field into separate compressional and shear components before integration.

Emmerich (Emmerich, H., PSV-wave propagation in a medium with local heterogeneities: a hybrid formulation and its application, Geophys. J. Int. 109, 54–64 (1992)) combined a reflectivity solution with a viscoelastic finite-difference scheme. The technique is efficient because it assumes that the scattering targets are overlain by stratified media. A hybrid technique can also be based on a reflectivity and a pseudo-spectral scheme to solve anelastic scattering problems.

The use of hybrid-FD schemes in borehole seimics is described by Kurkjian, A. L., R. T. Coates, J. E. White and H. Schmidt, Finite-difference and frequency-wavenumber modeling of seismic monopole sources and receivers in fluid-filled boreholes, Geophysics 59(1994), 1053–1064. The authors model sources and receivers in the presence of boreholes by interfacing a frequency-wavenumber method with a finite-difference scheme.

Robertsson et al. introduced an integrated Gaussian-beam technique with viscoelastic finite differences and a Kirchhoff method to simulate deep ocean seafloor scattering experiments (a hybrid technique referred to as HARVEST (Hybrid Adaptive Regime Visco-Elastic Simulation Technique), see Robertsson, J. O. A., J. O. Blanch and W. W. Symes, Viscoelastic finite-difference modeling, Geophysics 59(1994), 1444–1456; Robertsson, J. O. A., A. Levander and K. Holliger, Modeling of the Acoustic Reverberation Special Research Program deep ocean seafloor scattering experiments using a hybrid wave propagation simulation technique, J. Geophys. Res. 101(1996), 3085–3101 and (by the same authors) A hybrid wave propagation simulation technique for ocean acoustic problems, in: J. Geophys. Res. 101(1996), 11225–11241.

In inserting a wave field inside a finite-difference grid, there have generally been two approaches taken. Either, as was described by Alterman, Z. and F. C. Karal, Propagation of elastic waves in layered media by finite difference methods, Bull. Seis. Soc. Am. 58(1968) 367–398, the source wave field is inserted along a closed boundary inside the finite-difference grid so that the source wave field radiates out from it into the main part of the grid. The other approach has been to insert the wave field along a line inside a finite-difference grid which leads to artificial edge diffractions but allows coupling of different simulation methods (see for example Robertsson et al., J. Geophys. Res. 101 (1996), 11225–11241).

Based on the above, Zahradnik, J. and P. Moczo, in: Hybrid seismic modeling based on discrete-wave number and finite-difference methods, Pure Appl. Geophys.148 (1996), 21–38, inserted the source wave field along an open boundary bounded by a free surface (reflecting) at one side. The source wave field is calculated by an FD method using a homogeneous background medium. The FD calculation was repeated within the open boundaries after introducing a shallow basin into the homogeneous background. While including steps also found in the present invention, Zahradnik and Moczo used the known method solely to verify a hybrid (DW-FD) technique for earthquake seismology.

With respect to the second major direction of efforts to achieve significant computational savings, i.e., grid-refinement techniques, there are two constraints which limit finite-difference calculations. Those are the shortest wavelengths that occur in the simulation model and the complexity of the model. A maximum grid-step size to achieve a sufficiently accurate solution is constrained by either of these two conditions. By applying a finer grid in the parts of the model where the lowest seismic velocities or the highest structural complexity occur, a computationally efficient solution may be obtained. The complicated issue here is how to connect the different finite-difference grids to each other without introducing artificial boundary reflections.

McLaughlin, K. L. and S. M. Day in: 3D elastic finite-difference seismic-wave simulations, Computers in Physics 8(1994), 656–663, describe a three-dimensional (3-D) finite-difference grid-refinement technique based on viewing the entire grid as a tree structure of sub-grids with various discretizations.

In view of the above cited prior art it is an object of the invention to provide methods for improving the efficiency of seismic wave-field calculation. It is a more specific object of the invention to improve the efficiency and applicability of finite-difference methods for seismic exploration techniques, particularly for techniques which employ models subject to alteration(s).

SUMMARY OF THE INVENTION

The objects of the invention are achieved by methods and apparatus as set forth in the appended independent claims.

The present invention provides a method for efficiently computing the seismic response from a seismic model subject to one or a plurality of changes within a sub-set of said model. A seismic response is defined as a reconstruction of the motion of seismic energy stemming from at least one controlled source and recorded at one or a plurality of separate locations (recording points). For the purpose of the present invention, seismic energy includes acoustic, elastic and/or electromagnetic energy traveling through Earth formations. A seismic model is defined as a model of the Earth taking the form of one or more parameters defined for a discrete set of coordinates in space or in space and time. A subset is defined as a number of coordinates, said number being significantly smaller than the total number of coordinates of the model.

When applying finite-difference (FD) methods, the discrete set of coordinates is known as a grid. The FD method further comprises defining a finite-difference operator and boundary conditions. The FD operator is used to numerically propagate the energy through the grid in accordance with the parameter values at each grid point. In general, the FD operator is a finite difference approximation of one or a set of wave equations which describe the temporal distribution of energy (wave field) in the model. For the purpose of the present invention, FD operators include pseudo-spectral methods, finite-element methods (FEM), wavelet based methods, or other methods based on spatial discretization of the seismic model. In a preferred embodiment of the invention, the same FD operator is applied to the seimic model including the subset. However, a slightly modified FD operator might be used for the subset, provided that the modification of the FD operator does not create noticeable artifacts at the boundary between the subset and the other parts of the model.

The invention comprises the step of calculating the seismic response of the model using an FD method. The calculated response is stored generally in form of a time series or vector for a set of grid points. Furthermore the invention comprises the step of defining a boundary around a subset of the model. The boundary is preferably of a source injection type, but could include a combination of source injection type boundaries with absorbing boundary conditions.

The source injection boundary is characterized by firstly inserting a previously recorded wave field along the boundary and secondly canceling the outwardly propagating wave field, where this wave field is identical to the previously recorded wave field. The source injection step is therefore characterized by suppressing the propagation of energy from the interior, through the boundary and into the exterior. In other words, the suppression ensures that, when performing the FD recalculating on an unaltered subset, the field outside the subset is ideally zero, i.e., the stored field and the recalculated field cancel each other. Hence, outside the source injection boundary, the FD recalculation is limited to energy which is scattered or reflected within the subset due the changes of the model. In the following description, the scattered or reflected energy will be referred to as scattered wave field.

Within this subset, the model parameters are changed. After altering the subset, the seismic response of the subset is recalculated. This recalculation is initiated along the source injection boundary of the subset by loading the stored vectors for the grid points at that boundary. The recalculation is not restricted to the subset within the source injection boundary but does not involve the full FD grid. Instead the recalculation is restricted to an inner FD grid. The size of this inner FD grid is determined by a) the available computational resources and by b) the aim to include all geophysically significant parts of the model. Geophysically significant parts are those parts of the model which are likely to scatter or reflect a significant amount of the scattered wave field back to reference points where the wave field is recorded (see below). The radius or size of the inner FD grid can be chosen with respect to two-way travel times so as to get exact responses for first arrivals and a predetermined time window.

In variants of the invention, one full or outer FD grid may comprise several inner FD grids, which in turn may enclose several distinct and separate subsets each limited by a source injection boundary.

In a preferred embodiment of the invention, the scattered wave field is further recorded at predetermined positions (reference points) within the model. The location of the reference points is within the FD model space. When the wave field is to be propagated to receivers either within or outside the FD model space, the reference points are ideally located at positions along the path along which energy travels from the subset to the receivers.

The introduction of reference points or planes, though not necessary in basic variants of the invention, facilitates the propagation or extrapolation of the wave field to distant receiver locations. Receiver locations and reference points or planes will be separated by parts of the seismic model commonly referred to as "overburden", i.e., Earth formation or layers which are usually modeled with reduced accuracy or complexity. A considerable amount of computational savings can be realized by using propagator functions, such as Green's functions, between the reference points or plane and the distant receivers. Propagator functions can be derived through various numerical modeling techniques. Hence this specific aspect of the invention is applicable to seismic models where the overburden is modeled by a FD scheme, ray path methods, or any other known technique. Therefore it is advantageous to use reference points or planes in combination with hybrid techniques where the FD scheme is part of a larger seismic model.

A particular advantageous method involves the step of determining propagator functions for the path between the reference points or plane and the distant receivers. This step comprises replacing the distant receivers in the model by impulsive sources and calculating the response at the reference points or plane, using preferably an FD method. From this calculation the propagator functions from the reference points to the distant receivers can be obtained by application of the reciprocity theorem. This step is attractive as it maintains the high accuracy of the FD approach as compared to asymptotic (ray tracing) techniques whilst reducing the computational cost of propagating the wave energy through the full FD grid.

These and other features of the invention, preferred embodiments and variants thereof, and further advantages of the invention will become appreciated and understood by those skilled in the art from the detailed description and drawings following below.

MODE(S) FOR CARRYING OUT THE INVENTION

Figure 1:
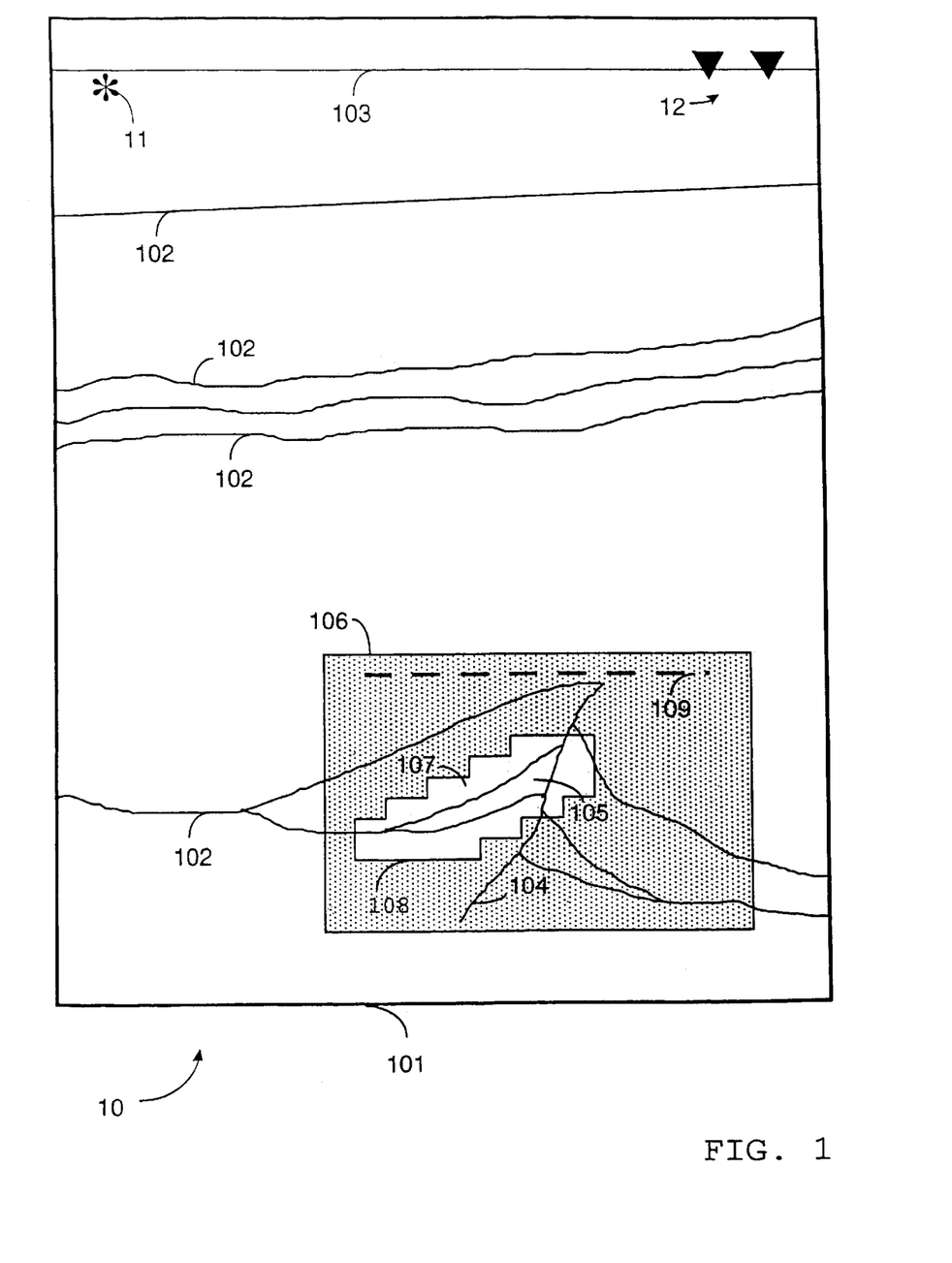
FIG. 1 shows a simplified model for an application of a finite-difference calculation in accordance with the invention.
Figure 2:
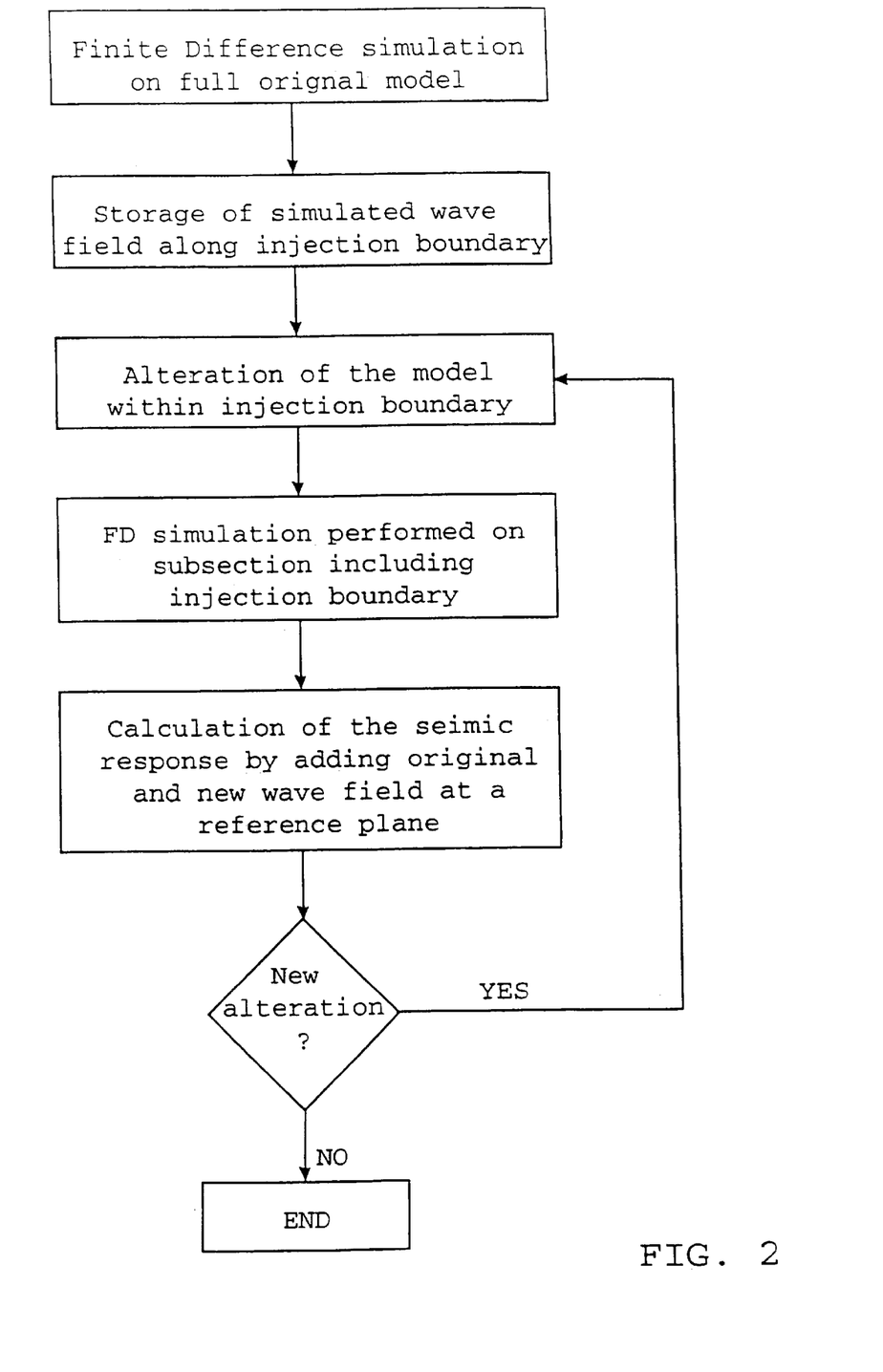
FIG. 2 shows a flow chart summarizing important steps of a finite-difference calculation in accordance with the invention.

The major steps of the following example are illustrated by a drawing (FIG. 1) and a flow diagram (FIG. 2).

In FIG. 1, there is shown a (simplified) two dimensional finite-difference Earth model 10. The FD model comprise a boundary 101 and several strata 102. The boundary can be designed for example as absorbing, reflecting or mixed. At the surface layer 103, the location of a source 11 and of receivers 12 is marked by a solid star and triangles, respectively. For the purpose of this example, the number of receivers is restricted to two. Most of the strata 102 form an overburden of comparatively flat layers. The deeper layers, however, are interrupted by an almost vertical fault 104, thus forming a potential trap 105 for hydrocarbons. A second (inner) boundary 106 encloses this potential trap 105 together with the remainder of a subset 107 and an injection boundary 108. Within this sub space 107, the model is changed during subsequent steps as described below. Further within the inner boundary 106 lies an array of reference points 109.

The seismic model can be represented by an initial material parameter vector $M_0$ which assigns materials properties to each grid point within the boundary 101. The described seismic model consists of three material properties that are defined in each grid-point: the Lame parameters $\lambda(x,z)$ and $\mu(x,z)$, and the density $\rho(x,z)$. Other applications of the invention may make use of a different set of parameters, such as stiffness matrices, Q values, or(for electromagnetic wave fields) conductivity, permeabilities, or dielectric properties.

Referring now to the flow diagram of FIG. 2, in a first step of the example an FD calculation over the full model is performed using conventional methods. In the example an explosive type 40 Hz Ricker wavelet is used as source 11. The wave energy is propagated using a staggered finite-difference scheme to solve the first order partial differential equations for stress and particle velocity describing isotropic elastic wave propagation in the 2-D Cartesian grid (x,z):

$$\frac{\partial \sigma_{xx}}{\partial t} = (\lambda + 2\mu)\frac{\partial v_x}{\partial x} + \lambda \frac{\partial v_z}{\partial z}$$

$$\frac{\partial \sigma_{zz}}{\partial t} = \lambda \frac{\partial v_x}{\partial x} + (\lambda + 2\mu)\frac{\partial v_z}{\partial z}$$

$$\frac{\partial \sigma_{xz}}{\partial t} = \mu \left( \frac{\partial v_x}{\partial z} + \frac{\partial v_z}{\partial x} \right)$$

$$\frac{\partial v_x}{\partial t} = \frac{1}{\rho} \left( \frac{\partial \sigma_{xx}}{\partial x} + \frac{\partial \sigma_{xz}}{\partial z} \right)$$

$$\frac{\partial v_z}{\partial t} = \frac{1}{\rho} \left( \frac{\partial \sigma_{xz}}{\partial x} + \frac{\partial \sigma_{zz}}{\partial z} \right)$$

In equations [1], $\sigma_{xx}(x,z,t)$, $\sigma_{zz}(x,z,t)$ and $\sigma_{xz}(x,z,t)$ are the components of the stress tensor, and $v_x(x,z,t)$ and $v_x(x,z,t)$ are the particle velocity components. The stresses and the particle velocities comprise the wave field and are discretized functions of both time and space. Due to the staggering they are not defined in exactly the same locations, but are shifted with respect to each other both in time and space, as is illustrated by the FD cell of FIG. 3.

An analogous set of equations can be applied to other forms of wave propagation, such as ground-penetrating radar (Maxwell's equations) as described for example by T. Bergmann, J. O. A. Robertsson, K. Holliger in: Geophys. Res. Lett., 23, No. 1, 45–48 (1996).

Figure 3:
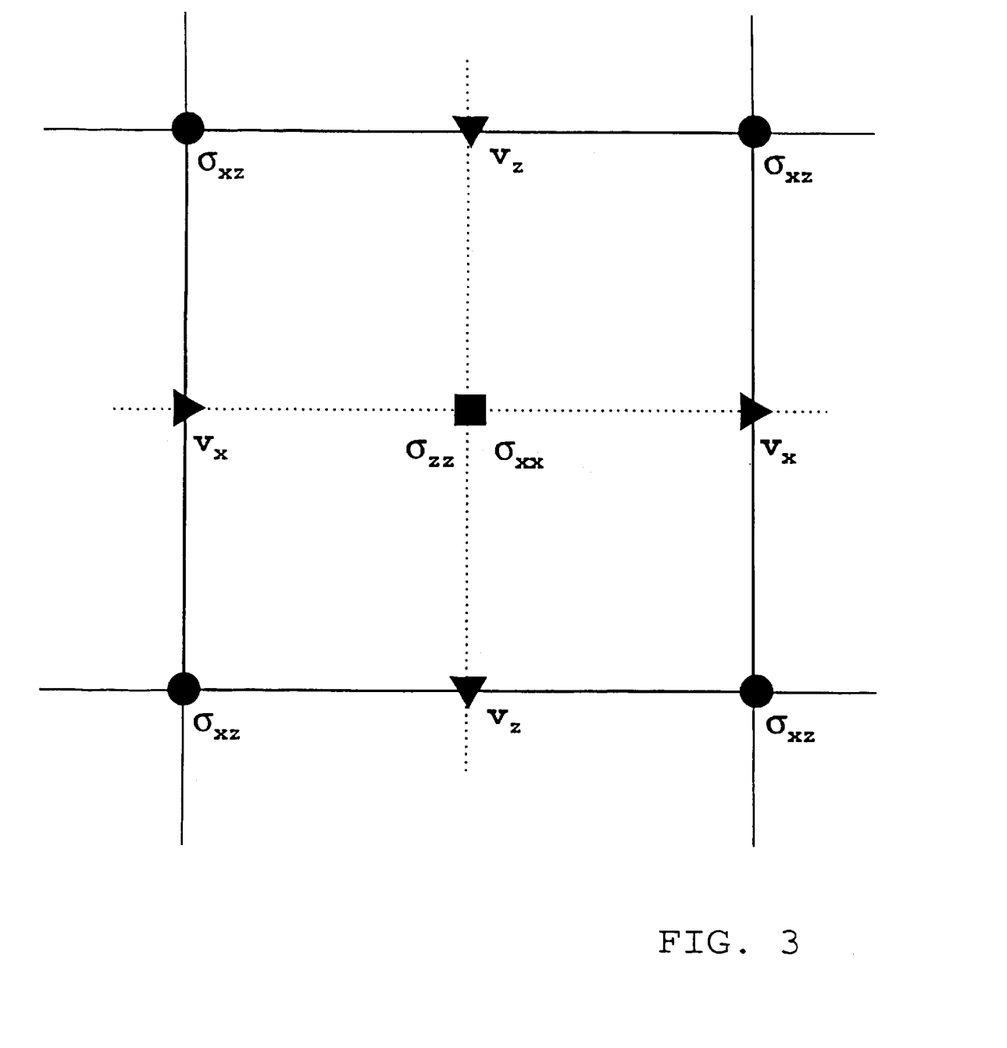
FIG. 3 depicts the vicinity of a staggered finite-difference grid cell used in an application of the present invention.

The normal stresses $\sigma_{xx}$ and $\sigma_{zz}$ have the same location in each grid cell. The shear stress component $\sigma_{xz}$ is staggered by half a grid-step in both the x- and z-directions with respect to the normal stresses. The $v_x$ component is staggered half a grid-step in the z-direction from the normal stresses, whereas the $v_x$ component is staggered half a grid-step in the x-direction. All stresses are defined at the same levels in time, whereas the particle velocities are staggered with half a time step with respect to the stresses.

A leap-frog scheme is used to update the stresses and particle velocities in time and a fourth-order accurate centered scheme is used for approximating the spatial derivatives. A more complete description of this family of finite-difference schemes has been presented by Robertsson, J. O. A., J. O. Blanch and W. W. Symes, Viscoelastic finite-difference modeling, Geophysics 59(1994), 1444–1456.

The finite-difference simulation is then performed by updating the stresses and particle velocities iteratively in each grid-point. During the simulation, stresses and particle velocities are recorded and stored along the closed boundary 108 and along the recording array 109 (FIG. 1). Since a fourth-order accurate spatial stencil is used, all five components of the wave field must be stored on four grid-points around 108 (see below).

After the full finite-difference simulation has been completed, an alteration is introduced in the model by changing $\lambda$, $\mu$ and/or $\rho$ at grid points inside the sub space 107. In the model, those alterations can be represented by adding to the initial material parameter vector $M_0$ a differential parameter vector $M_D$ representing the changes from the original to the new model $M_1$:

$$M_1 = M_0 + M_D \quad [2]$$

The two models and thus their material parameter vectors $M_0$ and $M_1$ are identical except in the geologically interesting region 105 which is surrounded by boundary 108 as illustrated in FIG. 1. The model material parameter vector $M_D$ is zero everywhere outside C. In making the partitioning of $M_1$, no assumptions or restrictions are made regarding the character (e.g. smoothness) of the models.

In a subsequent simulation step, the response of the new model $M_1$ is calculated. As emphasized before, this response is generated by a reduced finite-difference simulation run only within the inner boundary 106 of FIG. 1.

For the second FD calculation, the source field is introduced along the boundary 108. In each time step, $v_x$ and $v_z$ are first updated in the entire grid using the last two equations in the system of equations [1] (the equations of motion). When the update is complete, it is corrected at the points where the spatial finite-difference stencil intersects the boundary 108. Inside 108, the wave field is updated as if the source field were propagating through the entire grid. It is therefore necessary to add the $\sigma_{xx}$, $\sigma_{zz}$ and $\sigma_{xz}$ components of the source field to the parts of the stencil that are outside 108. For a fourth order accurate scheme, $\sigma_{xx}$, $\sigma_{zz}$ and $\sigma_{xz}$ of the source wave field has to be known along the two closest grid points outside 108. This part of the wave field is read from the external file containing the wave field along 108 that was stored during the first full simulation. Outside 108, the wave field is updated as if no source field were injected. Therefore the injected $\sigma_{xx}$, $\sigma_{zz}$ and $\sigma_{xz}$ components of the source field are subtracted from the parts of the stencil that are inside 108 at points where the stencil intersects 108.

Again, this part of the source injection field is read from the external file where the wave field along the two closest grid-points inside 108 is stored.

Next, the calculation is advanced by half a time step and $\sigma_{xx}$, $\sigma_{zz}$ and $\sigma_{xz}$ are updated in the entire grid using the first three equations in the system of equations [1]. The injection of the source wave field is performed using the same procedure by adding and subtracting the $v_x$ and $v_z$ components of the wave field at the four grid points around 108. Totally, four grid points with the values of $\sigma_{xx}$, $\sigma_{zz}$, $\sigma_{xz}$, $v_x$ and $v_z$ around 108 are required from the first full simulation, staggered appropriately both in time and space.

By iterating these two steps of the update, the entire simulation is stepped through and the source wave field from the first simulation is injected along the boundary 108. Again, the wave field is recorded and stored along the line of reference points 109.

Finally, when the finite-difference simulation using the smaller altered model is completed, the recorded wave field along reference plane 109 is added to the wave field that was recorded along plane 109 in the first full simulation. The resulting seismogram closely corresponds to the wave field that would have been obtained by executing the full finite-difference simulation using the altered seismic model.

Whereas the simplified model of FIG. 1 is chosen to clarify major aspects of the invention, the novel method is tested on a more complex and realistic seismic model. This model contains geologic structures that are difficult to image such as lenses, faults and "pinch-out" structures (gradually eroded sediment sequences). The model has a free-surface on the top (flat sea surface) and absorbing boundary conditions applied on the sides. Furthermore, the model includes two oil reservoir layers split by a fault into four oil bearing units.

The model in combination with the novel FD calculation method is used to monitor the evolution of a reservoir rock during production. Extraction of hydrocarbons is believed to cause detectable changes in the seismic response. In particular, oil and gas are replaced by water as it is produced. In this example the differences have therefore been investigated in the response from the initial model and a model where the oil has completely been replaced by water in one of the oil-bearing layers. This example seeks to illustrate a typical application to time-lapse or 4D seismics.

In the following, the effectiveness of the novel method is validated by calculating the response of an altered seismic model using a known and the novel method.

Figure 4:
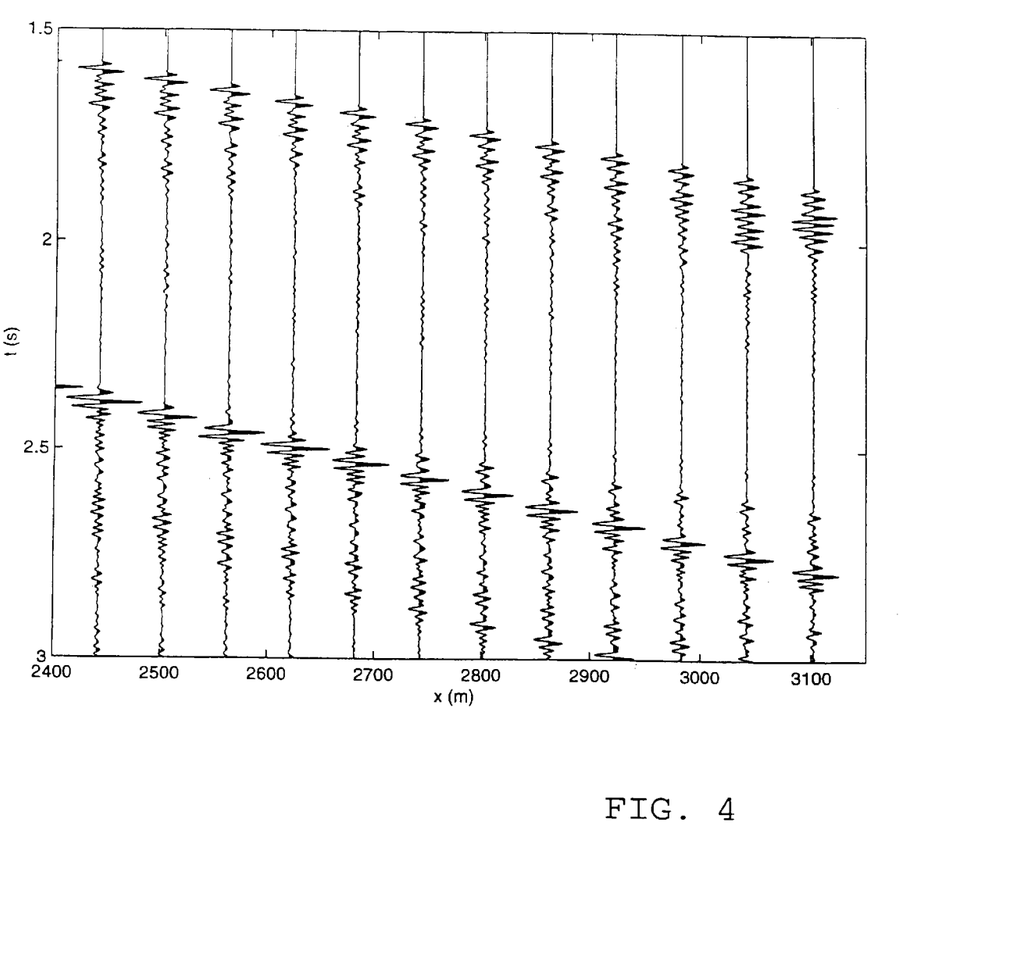
FIG. 4 shows part of a seismogram generated from a seismic model through a conventional finite-difference calculation before alteration of the model.

Firstly, a complete FD calculation for the full model before alteration is performed. Part of the simulated receiver response, i.e. the vertical velocity in a narrow time-space window, is shown in FIG. 4. This receiver response is calculated along a receiver line equivalent to the reference plane 109 of FIG. 1. As a next step, the model vector is changed so as to simulate the replacement of oil by water in one of the layers.

Figure 5:
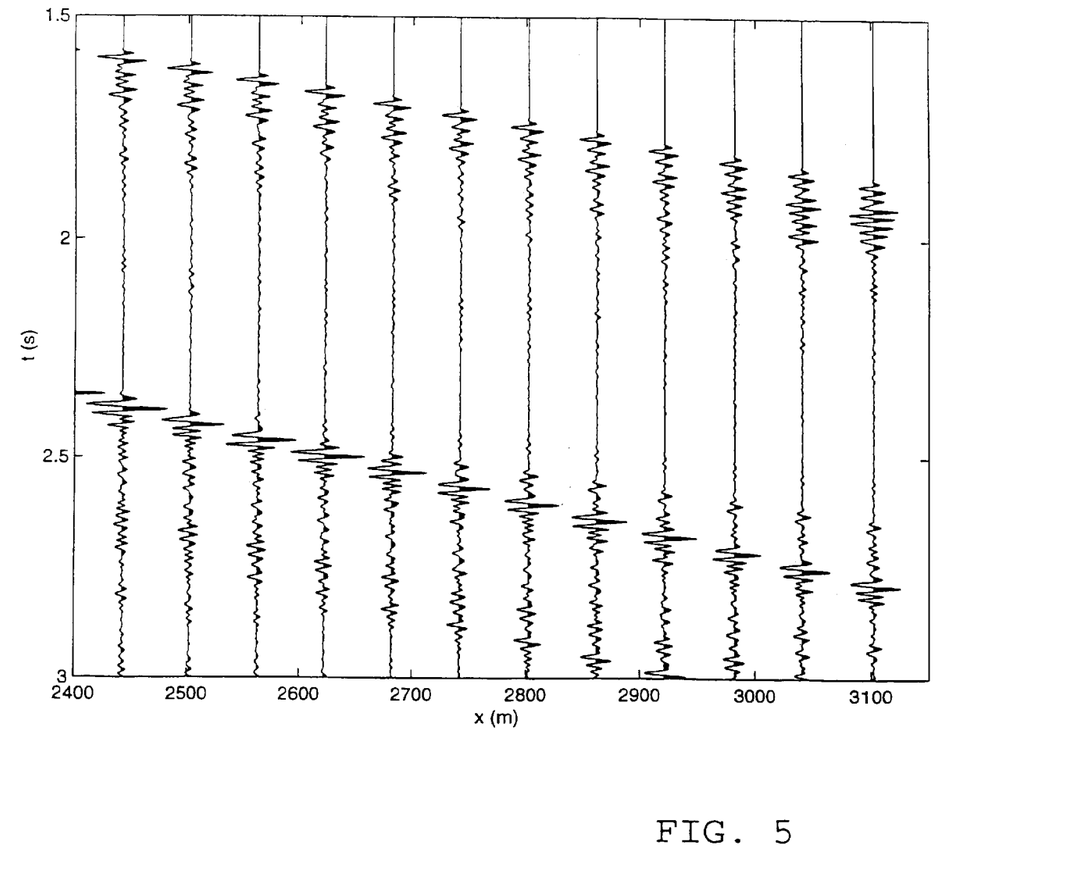
FIG. 5 shows the analogous seismogram of FIG. 4 generated by a conventional finite-difference calculation performed after alteration of the model.

The traditional and considerably more computationally expensive way of simulating the response of the altered model is to redo the simulation completely. In FIG. 5, the result of this method is shown. This simulation serves as a reference for validating the new method.

Figure 6:
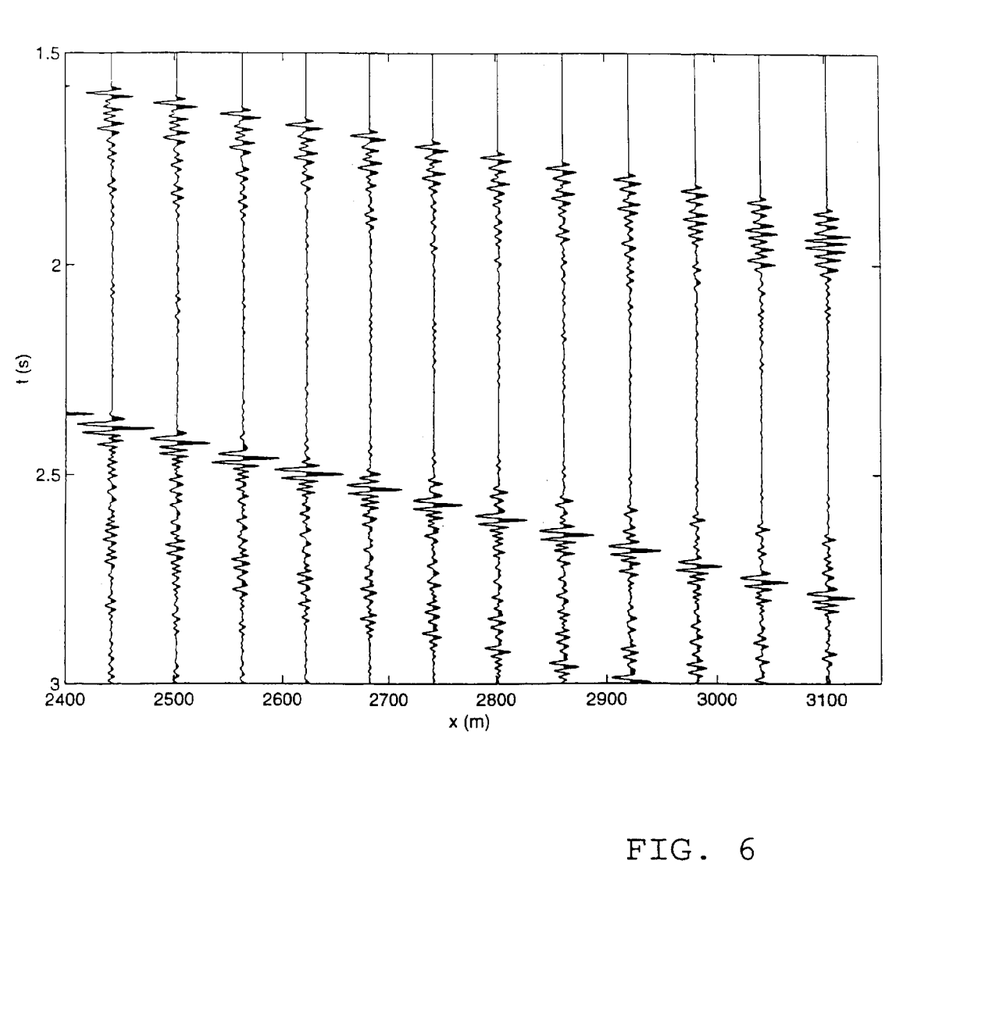
FIG. 6 shows the analogous seismogram of FIG. 5 generated by a reduced finite-difference calculation in accordance with the present invention performed after alteration of the model.

In FIG. 6, the seismic response of the altered model is calculated using the new method, adding the response from a reduced simulation restricted to the volume in which the model is changed (and including the receiver line). After fluid replacement, when injecting the source field from the full simulation before fluid replacement from a boundary corresponding to C in the model of FIG. 1, the newly calculated response is added at the reference points to the response from the full simulation before fluid replacement. The two seismograms of FIG. 5 and 6 are visually indistinguishable illustrating the success of the novel approach.

Figure 7:
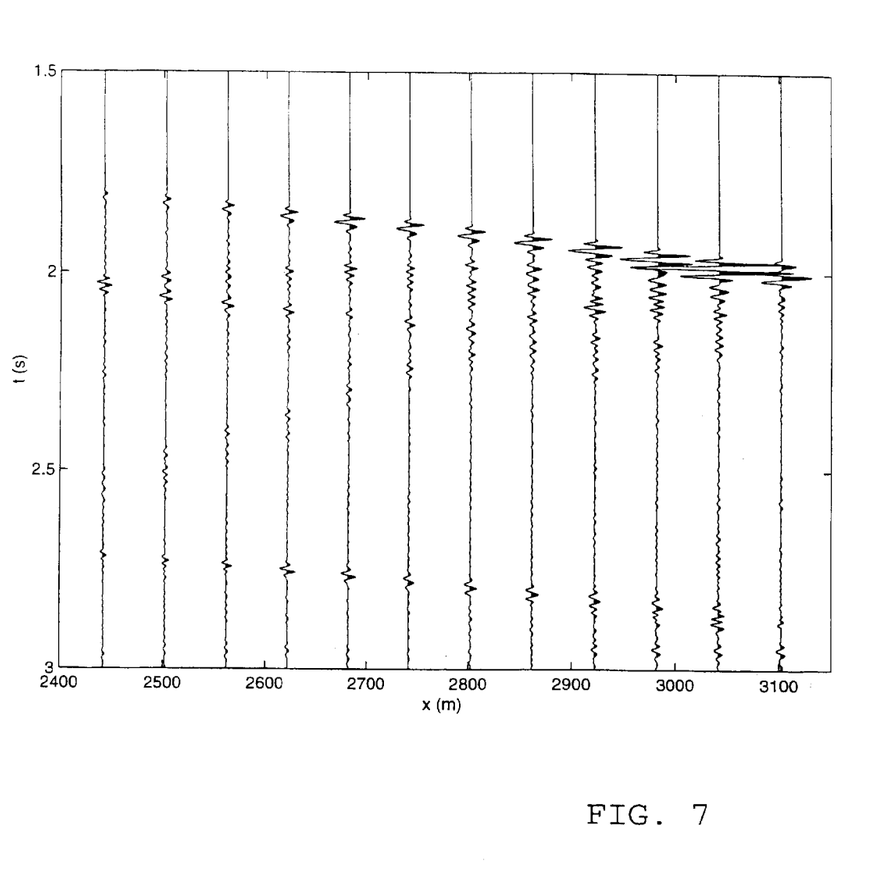
FIG. 7 shows the difference between the seismograms of FIG. 4 and 5.

The versatility of the new method is further demonstrated by plotting in FIG. 7 the difference of the recorded field from the two full simulations (FIGS. 4 and 5). This difference plot is scaled by a factor of 10 compared to the plots described before.

Figure 8:
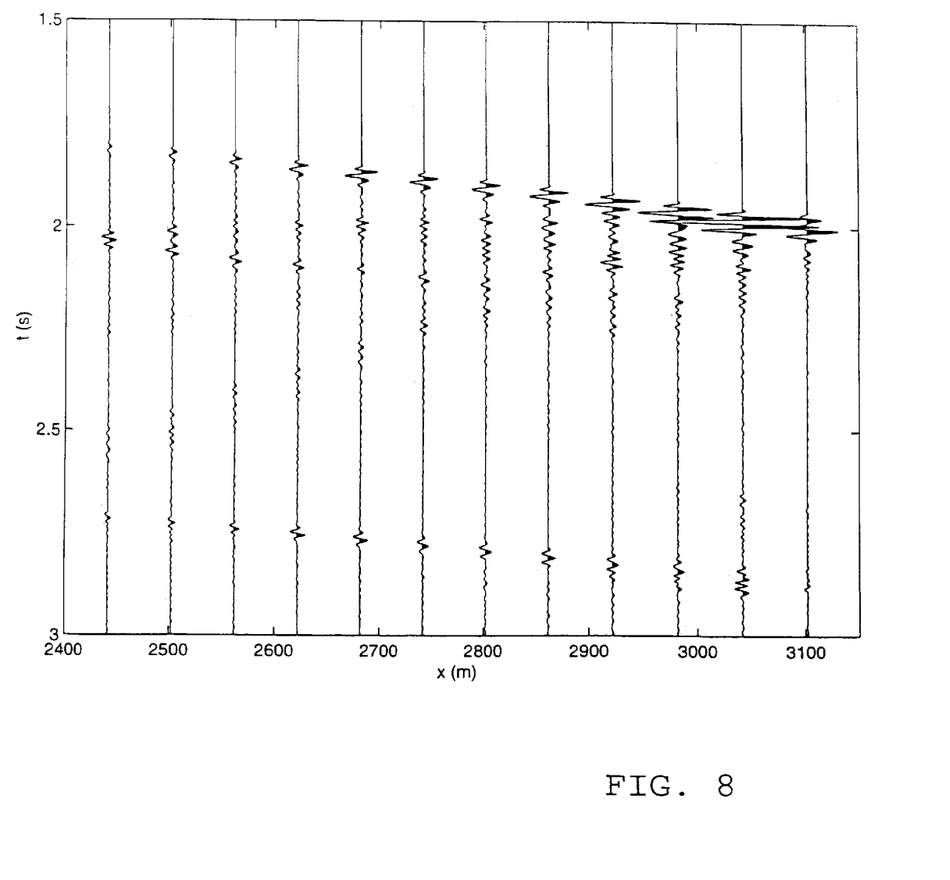
FIG. 8 shows the analogous seismogram of FIG. 7 directly calculated using a method in accordance with the present invention.
Figure 9:
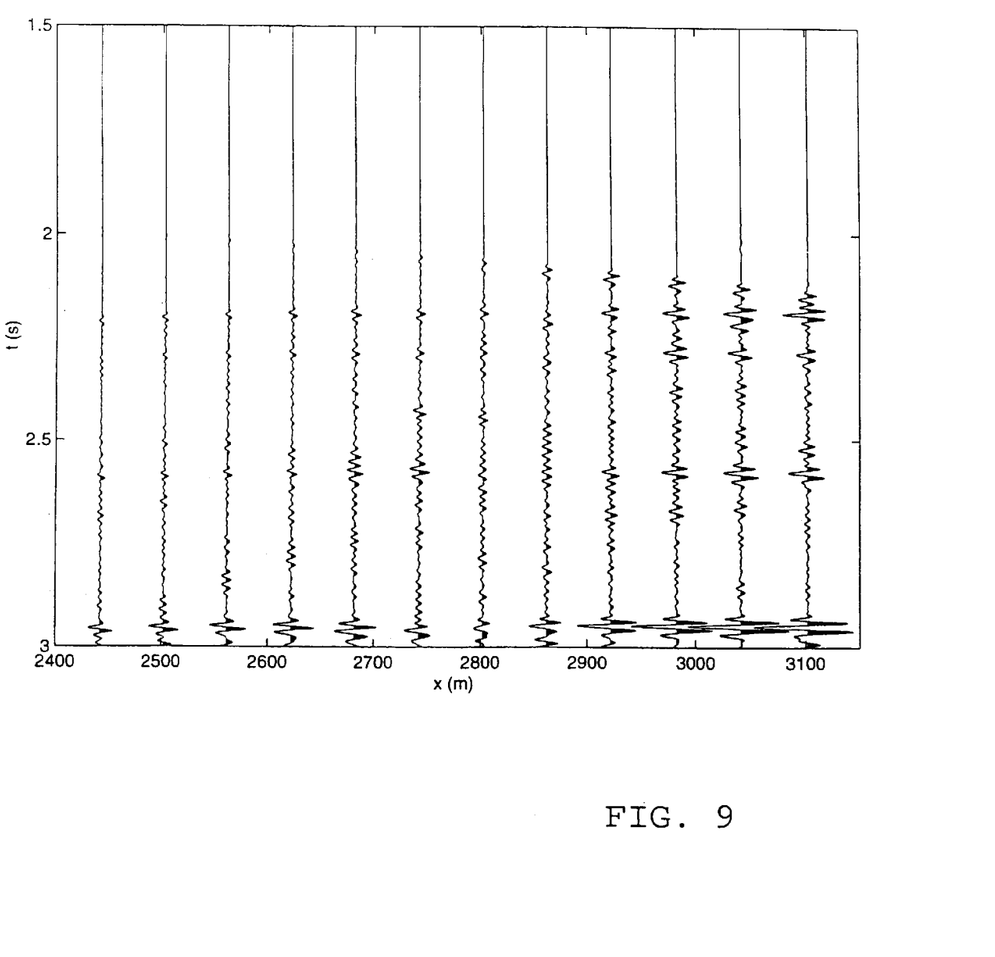
FIG. 9 shows the difference between the seismograms of FIG. 7 and 8.

In FIG. 8, the response recorded directly using the new method (scaled by a factor of 10) without adding the newly calculated receiver response to the stored one. Again, the two sections (FIGS. 7, 8) are virtually identical which is further illustrated in FIG. 9, where the difference between the seismograms shown in FIGS. 7 and 8 is plotted scaled by a factor of 100. The differences visible in the lower part of the section on this magnified scale are caused by either reflections from the absorbing boundaries or multiple interactions of the differential scattered/reflected wave field outside the inner boundary. However, the first part of the wave field is very accurately reproduced.

It is worth noticing that these latter difference plots, i.e. FIGS. 7 and 8, form the essential steps of time-lapse seismic surveys.

In the simulations using the complex model, the recalculation of the seismogram after fluid replacement requires 9.5 times less memory. The savings in terms of computations are on the order of a factor of 15 since the wave field initially is zero. For 3-D models the savings are even larger. As it can be assumed that similar savings could be realized along the third spatial dimension, savings on the order of a factor of 30 in memory and a factor of 45 in terms of the number of computations are possible.

It is noteworthy that the boundary 108 (see FIG. 1), where the source field is injected can often be made very small relative to the complete original model. Thus only a small fraction of the source field needs to be saved, often on disk, enabling long simulation times. In the example presented here to store the first 1.5 s of wave propagation through the source injection boundary 108 requires 124 MBytes of disk space. For comparison, optimal storage of the entire wave field in all points and at all times would require around 16 GBytes in the small finite-difference simulation (i.e. within the inner boundary 106) and 150 Gbytes in the simulation using the full model.

Referring back to FIG. 1, to propagate the wave field u recorded at the reference points 109 to receiver points 12 located at the surface, those receiver points are replaced by unit impulse sources generating wave energy with vertical and horizontal polarization. This energy represents the Green's function for the path between the receiver points 12 and any point within the FD grid 101 where the wave field is recorded. The Green's functions are reciprocal, i.e., invariant against a change of source and receiver positions. Thus, recording the impulse response G at the reference points 109 and applying Green's theorem yields the seismic response v at receiver points 12 as $$v = \int_{S_{108}} G * u \, dS,$$

where $S_{109}$ is a surface including the reference points.

What is claimed is:

1. Method of determining the seismic response to seismic energy propagating through an Earth model, comprising the steps of
   determining the seismic response within an outer finite-difference grid;
   storing said first response at grid points forming at least one source injection boundary enclosing a sub space of said model;
   changing model parameters at grid points within said sub space so as to generate an altered Earth model;
   subsequently determining a second seismic response within at least one inner finite-difference grid, said inner grid enclosing said at least one source injection boundary and being enclosed in said outer finite-difference grid, using energy propagated from said at least one source injection boundary.

2. The method of claim 1, further comprising the step of adding the first and the second seismic response so as to determine a seismic response at reference points after the changing of model parameters.

3. The method of claim 1, wherein the determined seismic response and a seismic response measured by a seismic receiver are compared.

4. The method of claim 1, wherein the inner finite-difference grid covers a geologically significant part of the seismic model, said part lying wholly within the interior of the Earth.

5. The method of claim 1, wherein the source injection boundary is closed.

6. The method of claim 1, wherein the source injection boundary is a combination of source injection boundary and absorbing boundary.

7. The method of claim 1, wherein the outer finite-difference grid encloses a plurality of inner finite-difference grids and/or the inner finite-difference grid encloses a plurality of injection boundaries.

8. The method of claim 2, wherein the seismic response at the reference points is propagated to distant receivers through the outer finite-difference grid using Green's functions.

9. The method of claim 2, wherein the seismic response at the reference points is propagated to distant receivers through the outer finite-difference grid using Green's functions, said functions being determined by an application of the reciprocity theorem.

10. The method of claim 1, wherein the outer finite-difference grid is embedded in a hybrid model using a second numerical method of propagating wave energy to and/or from the boundary of said outer finite-difference grid.

11. The method of claim 1, used iteratively to adapt the response of the (altered) Earth model to a measured seismic response.

* * * * *